2,895,980
ALLYL ESTERS OF MONO-SUBSTITUTED DITHIOCARBAMIC ACIDS

Marion W. Harman, Nitro, and Harry W. Kilbourne, South Charleston, W. Va., assignors to Monsanto Chemical Company, St. Louis, Mo., a corporation of Delaware No Drawing. Application November 10, 1955
Serial No. 546,275

6 Claims. (Cl. 260—455)

This invention relates to a new class of compounds and to methods for their preparation. More particularly, this invention relates to allyl esters of dithiocarbamic acids containing one hydrogen on the nitrogen.

The compounds of this invention may be represented by the general formula $$\begin{array}{c} \text{H} \quad \text{S} \\ \text{R}-\text{N}-\overset{\|}{\text{C}}-\text{S}-\text{allyl} \end{array}$$

where R is an organic radical aliphatic in nature, as for example alkyl, alkoxyalkyl, alkenyl, alkenyloxy, aralkyl and cyclohexyl. These compounds comprise nematocides, germicides, industrial preservatives, soil fumigants and herbicides, depending upon the particular R group.

The new compounds may be readily prepared by condensing a water soluble alkali metal salt of a mono-substituted dithiocarbamic acid with allyl chloride.

The following examples illustrate the preparation but are not to be taken as limitative.

Example 1

In a reactor provided with a sealed stirrer, thermometer, reflux condenser, dropping funnel and ice-bath was charged 59.1 grams (1 mole) of isopropylamine, 160 grams (1 mole) of 25% sodium hydroxide and 300 grams of water. To this mix was added with stirring over a period of 7 minutes at 15–22° C. 76 grams (1 mole) of carbon disulfide. The ice-bath was then removed and stirring continued for 30 minutes. Thereupon 76.5 grams (1 mole) of allyl chloride was added in one portion, causing the temperature to rise from 25 to 52° C. in 12 minutes. Stirring was then continued for 4 hours and the product which separated was washed neutral with water, filtered through clay and heated in vacuo up to 100° C./1 mm. The allyl isopropyldithiocarbamate so obtained was an amber oil. The yield was 83.3% of the theoretical. Analysis gave 8.04% nitrogen and 34.87% sulfur as compared to 7.99% nitrogen and 36.58% sulfur calculated for $C_7H_{13}NS_2$.

Example 2

In the procedure of Example 1, 124 grams (1 mole) of 25% methylamine was substituted for the isopropylamine. The exothermic reaction caused the temperature to rise from 23 to 49° C. in 16 minutes. The reaction mixture was stirred for 5 hours and the product isolated as described. The allyl methyldithiocarbamate was an amber oil analyzing 10.0% nitrogen and 40.53% sulfur as compared to 9.51% nitrogen and 43.55% sulfur calculated for $C_5H_9NS_2$. The yield was 76.6% of the theoretical.

Example 3

In a reactor as described in Example 1 there was charged 62.6 grams (0.5 mole) of 2,5-endomethylene cyclohexylmethylamine, 80 grams (0.5 mole) of 25% sodium hydroxide and 350 grams of water containing 0.5 gram of a 30% solution of a surface active agent (dodecylbenzene sodium sulfonate). To this solution was added in 15 minutes at 20–25° C. 38 grams (0.5 mole) of carbon disulfide. The ice-bath was removed, stirring continued for 3 hours and then 38.3 grams (0.5 mole) of allyl chloride added in one portion, causing a temperature rise from 24 to 39° C. in 10 minutes. After stirring for an additional 5 hours, the product was taken up in ether, washed neutral with water and the solvent removed in vacuo. The allyl N-2,5-endomethylene cyclohexyl methyldithiocarbamate, an amber oil, was obtained in 89.6% theory yield. Analysis gave 6.24% nitrogen and 23.21% sulfur as compared to 5.80% nitrogen and 26.56% sulfur calculated for $C_{12}H_{19}NS_2$.

Example 4

In the procedure of Example 3, 43.5 grams (0.5 mole) of 2-vinyloxyethylamine was substituted for the 2,5-endomethylene cyclohexyl methylamine. The exothermic reaction caused the temperature to rise from 25 to 46° C. in 10 minutes. The aliyl N-2-vinyloxy ethyldithiocarbamate was a red oil obtained in 85.7% theory yield. Analysis gave 7.16% nitrogen and 30.65% sulfur as compared to 6.89% nitrogen and 31.54% sulfur calculated for $C_8H_{13}NOS_2$.

In a similar manner and substituting the appropriate reactants, other examples were prepared. The amber liquids obtained had the following analyses:

| Ex. No. | Structural formula | Analysis, percent | |
|---|---|---|---|
| | | Calcd. | Found |
| 5 | 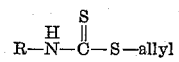 CHNHCSSCH₂CH=CH₂ with CH₃ and C₂H₅ groups | N, 7.40<br>S, 33.87 | N, 7.64<br>S, 31.39 |
| 6 | CH₃CHCH₂CHNHCSSCH₂CH=CH₂ with CH₃, CH₃ | N, 6.44<br>S, 29.50 | N, 6.61<br>S, 28.00 |
| 7 | (2,5-endomethylene cyclohexyl) NHCSSCH₂CH=CH₂ | N, 6.50<br>S, 29.77 | N, 6.79<br>S, 28.05 |

Example 8

In a reactor as described was charged 31.3 grams (0.5 mole) of 72% ethylamine, 80 grams (0.5 mole) of 25% sodium hydroxide and 150 grams of water. To this solution was added in 5 minutes at 15–20° C. 38 grams (0.5 mole) of carbon disulfide. After stirring for 45 minutes with ice-bath removed, a clear solution was obtained. Then, 38.3 grams (0.5 mole) of allyl chloride was added in one portion, causing the temperature to rise from 27 to 50° C. in 10 minutes. The product was stirred for 5 hours, washed neutral with water and dried in vacuo at 100° C./12 mm. The allyl N-ethyldithiocarbamate, a red oil, was obtained in 80.6% theory yield. Analysis gave 8.77% nitrogen and 38.22% sulfur compared to 8.68% nitrogen and 39.76% sulfur calculated for $C_6H_{11}NS_2$.

By a similar procedure, the following new compounds were prepared. Example 9 was an amber liquid while the other examples comprise red liquids:

| Ex. No. | Structural formula | Analysis, percent | |
|---|---|---|---|
| | | Calcd. | Found |
| 9 | (CH₃)₂CHOCH₂CH₂CH₂NHCSSCH₂CH=CH₂ | N, 6.00<br>S, 27.48 | N, 6.04.<br>S, 25.64. |
| 10 | CH₃OCH₂CH₂CH₂NHCSSCH₂CH=CH₂ | N, 6.82<br>S, 31.23 | N, 6.70.<br>S, 29.09. |
| 11 | CH₃OCH₂CH₂NHCSSCH₂CH=CH₂ | N, 7.32<br>S, 33.52 | N, 7.00.<br>S, 31.53. |
| 12 | CH₂=CHCH₂NHCSSCH₂CH=CH₂ | N, 8.08<br>S, 37.00 | N, 8.16.<br>S, 34.96. |
| 13 | 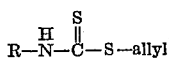 CH₃ on phenyl CHNHCSSCH₂CH=CH₂ | N, 5.90<br>S, 27.02 | N, 5.75.<br>S, 25.71. |
| 14 | (CH₃)₂CHCH₂NHCSSCH₂CH=CH₂ | N, 7.40<br>S, 33.87 | N, 7.02.<br>S, 32.45. |

It is intended to cover all changes and modifications of the examples of the invention herein chosen for purposes of disclosure which do not constitute departures from the spirit and scope of the invention.

What is claimed is:

1. A compound of the structure

$$\overset{H}{R-N}-\overset{S}{\overset{\|}{C}}-S-\text{allyl}$$

where R represents an organic radical selected from the group consisting of alkyl, alkenyl, aralkyl and alicyclic radicals.

2. A compound of the structure

$$\overset{H}{R-N}-\overset{S}{\overset{\|}{C}}-S-\text{allyl}$$

where R is an alkyl group of less than three carbon atoms.

3. A compound of the structure

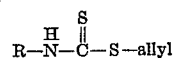

$$\overset{H}{R-N}-\overset{S}{\overset{\|}{C}}-S-\text{allyl}$$

where R is an alkenyl group.

4. The compound of the structure $$CH_3NHCSSCH_2CH=CH_2$$

5. The compound of the structure $$C_2H_5NHCSSCH_2CH=CH_2$$

6. The compound of the structure $$CH_2=CHCH_2NHCSSCH_2CH=CH_2$$

References Cited in the file of this patent

UNITED STATES PATENTS

| | | |
|---|---|---|
| 2,127,375 | Bousquet | Aug. 16, 1938 |
| 2,579,384 | Handy et al. | Dec. 18, 1951 |
| 2,786,866 | Hook et al. | Mar. 26, 1957 |